April 30, 1940.    R. W. YOUNG    2,199,060
SLEEP INHIBITOR
Filed April 20, 1937
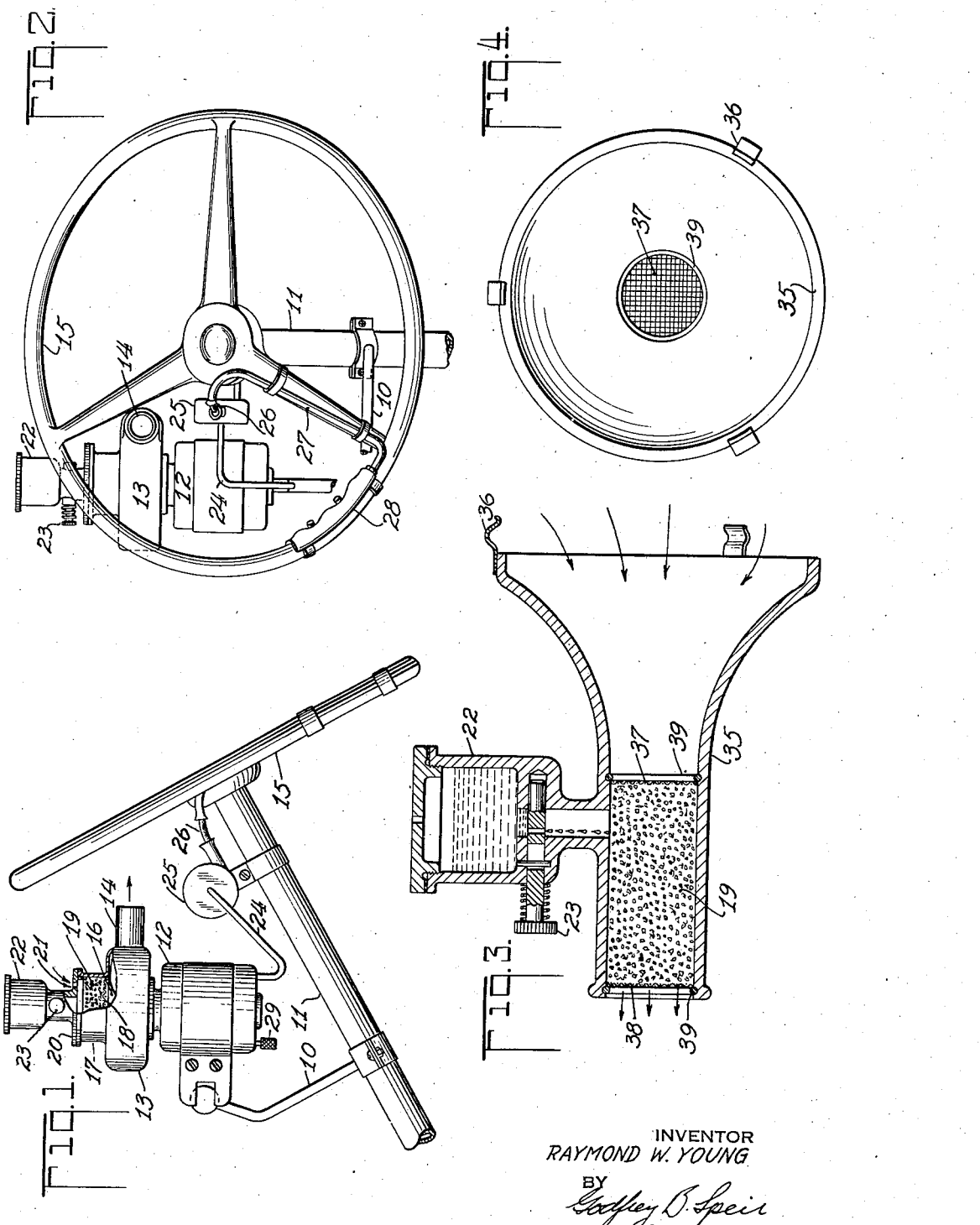
INVENTOR
RAYMOND W. YOUNG
BY
Godfrey D. Speir
ATTORNEY

UNITED STATES PATENT OFFICE

2,199,060
SLEEP INHIBITOR
Raymond W. Young, Maywood, N. J.

Application April 20, 1937, Serial No. 137,989

4 Claims. (Cl. 177—311)

This invention relates to a method of inhibiting sleep and to apparatus for accomplishing the method in a practicable manner.

Drivers and operators of vehicles such as automobiles, trucks, buses, aircraft, rail equipment and the like, whose senses must be continually alert, frequently feel drowsiness and sleepiness resulting from fatigue or over-long concentrated attention in tending the proper operation of the vehicle, and, as a matter of fact, the greatest fear of professional drivers is that of falling asleep at the controls. Many vehicular accidents are attributable to the operator falling asleep or becoming so drowsy that he cannot properly control the vehicle, and unfortunately, the somnolence is very difficult to overcome. Bus and truck drivers as a regular practice, consume large quantities of coffee to overcome the tendency toward drowsiness, but this it not very satisfactory, since its effects may wear off between stops or stations and no relief from sleepiness may be immediately available enroute.

An object of the present invention is to provide, on a vehicle, an immediately available means, physiologically and organically harmless, for inhibiting drowsiness, a further object being to make the means, if so desired, automatically responsive in its operation to the muscular relaxation which attends the initiation of somnolence.

A further object is to provide means for retaining aromatic agents in such manner as to be readily available for delivery as a gas toward the head of a vehicle operator to promote sleep inhibition.

The specific details of the invention may be understood by reading the annexed description in connection with the drawing, in which:

Fig. 1 is a side elevation of one form of an automatic sleep inhibitor as applied to the conventional steering column and wheel of a motor vehicle, Fig. 2 is an elevation of the apparatus as viewed from the operator's position, Fig. 3 is an axial section of an alternative embodiment, and Fig. 4 is an end view of the alternative.

Referring to Figs. 1 and 2, a bracket 10, clamped to a steering column 11, supports a small electric motor 12 on which is mounted a conventional centrifugal blower 13, the delivery duct 14 of which points through a steering wheel 15 toward the face of the vehicle operator. The intake duct, or eye 16, of the blower, is provided with a casing 17 having a wire mesh floor 18 over the eye 16, the casing being filled with salts 19, these salts, if desired, being pleasantly scented. A cover 20, having air entrance openings 21, is formed with a liquid reservoir 22 and a valve 23, the latter being operable to permit liquid in the reservoir 22 to drip slowly into the salts 19. The liquid may be aromatic spirits of ammonia or other material, which, when inhaled, has sleep inhibiting tendencies. Alternatively, the liquid may be omitted and the salts 19 may be of a soluble or volatile, sleep inhibiting character, ephedrine being such a product, whereby air passing through the salts volatilizes same to produce a gas of low concentration for delivery by the blower.

The motor 12 is normally inactive, and may be selectively started by a conventional switch, power for the motor being furnished from the vehicle electric system. Automatic motor starting is shown in Figs. 1 and 2, wherein a motor wire 24 leads to a spring reel 25 clamped to the column 11, and a flexible conductor 26 issues therefrom passing through a conduit 27 to a grip switch 28 clamped to the rim of the wheel 15. The reel and flexible conductor permit normal use of the steering wheel and constant utility of the grip switch in any position of the wheel. This switch is organized to close the motor circuit when not gripped, and to open the motor circuit when grasped to the firmness necessary for proper vehicle control. Normally the operator will grasp the grip 28 firmly enough to keep the motor circuit open, but if he should become drowsy, his fingers will relax, effecting motor energization in turn causing a gentle breeze of aromatic, sleep inhibiting gas to be directed toward his face. By inhaling the sleep inhibiting gas, he will become fully awake and alert. A master switch 29 serves to open the motor circuit when the device is not needed.

An alternative arrangement of the apparatus is shown in Figs. 3 and 4, this comprising a salt containing funnel element 35 adapted to be clipped over the guard ring of a conventional suction operated defrosting fan as commonly used on automotive vehicles, by spring clips 36. The salts 19 are retained in the element 35 by screens 37 and 38 fastened thereto by split spring rings 39 snapped into grooves formed in the element. The reservoir 22 and valve 23, as previously described, are carried by the element 35.

The means for blowing air through sleep inhibiting material need not be limited to the devices shown—the invention also contemplates flexible shaft driven fans or any other convenient and practicable means for producing an air blast of the desired intensity.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. The combination with a vehicle having a control member adapted to be controlled by a vehicle occupant, a seat for the occupant, blower means mounted within the vehicle adjacent said seat comprising an atomizer for delivering sleep inhibiting vapor toward said operator, and means on the control member to selectively operate said atomizer.

2. In combination, a vehicle having a seat for an occupant, a power driven blower mounted on the vehicle adjacent the seat and directed so as to blow toward an occupant of said seat, a sleep inhibiting agent carried by and adapted to be atomized by said blower, and means close to the seat for selectively operating said blower.

3. In combination in a mechanism having a control member, a vaporizer mounted close to said member arranged, when operating, to deliver a sleep inhibiting vapor, and a pressure responsive switch on the control member for starting operation of said vaporizer.

4. In combination in a travelling vehicle having a vehicle control member required to be held continuously during vehicle travel, a pressure responsive switch on said member, and a vaporizer for delivering a sleep inhibiting vapor in the zone of said member, responsive in its operation to non-pressure on said switch.

RAYMOND W. YOUNG.